United States Patent Office 3,539,852
Patented Nov. 10, 1970

3,539,852
HOMOPOLAR ELECTRICAL MACHINES
Anthony Derek Appleton and Robert Beattie MacNab, New Castle upon Tyne, England, assignors to International Research & Development Company Limited, Newcastle upon Tyne, England
Filed Aug. 20, 1969, Ser. No. 851,682
Claims priority, application Great Britain, Aug. 26, 1968, 40,643/68
Int. Cl. H02k 31/00, 13/00
U.S. Cl. 310—178                         13 Claims

ABSTRACT OF THE DISCLOSURE

A dynamo-electric machine, particularly a disc-type homopolar machine with a superconducting field coil, having a current-transfer interface shaped to conform to the lines of force of the magnetic field in order to avoid circulating currents in the brush gear and the contact surface engaged by the brush gear. A convenient approximation which does not require complex brush shapes is provided by two frustoconical contact surfaces coaxial with the rotor.

---

The present invention relates to current transfer in dynamoelectric machines. It is especially applicable to homopolar machines, both of the disc and drum type, such as are described, for example, in our British patent specification No. 1,133,724 and in our Swiss patent specification No. 470,795. These describe homopolar machines in which a very strong magnetic field is produced by a stator winding employing one or more superconducting coils.

The rotor conductor or conductors of such machines are generally of very low electrical resistance in order to allow the flow of large current through them and brushes of substantial contact area may be required to convey current to and from the rotor. The position at which current transfer at a brush to slip-ring interface must take place is in many cases such that the magnetic field of the stator winding causes electromotive forces (E.M.F.'s) of varying values to be set up over an area of slip-ring surface in contact with brushgear. The magnitude of such E.M.F.'s is in most cases relatively small, but in view of the high field strength and the low resistance of the slip-ring across which the E.M.F.'s act, appreciable circulating currents may result appearing as stray losses in the machine.

In accordance with the present invention there is provided a dynamo-electric machine having a rotor and a stator and including current transfer means comprising fixed and moving elements in contact with each other over a common interface, the said interface being so disposed within a magnetic field existing in the machine as to minimize the number of lines of force intersecting the interface.

The fixed element of the current transfer means may be a contact ring on the rotor co-axial with the rotor and the surface of the ring may either be curved to follow the lines of force or can be made up of one or more axially-adjacent frusto-conical parts which approximate sufficiently closely to the curved surface and enable the stationary element to have generally planar contact faces, thus avoiding the necessity for a concave contact surface to be formed on, for example, a carbon brush.

Figure 1:
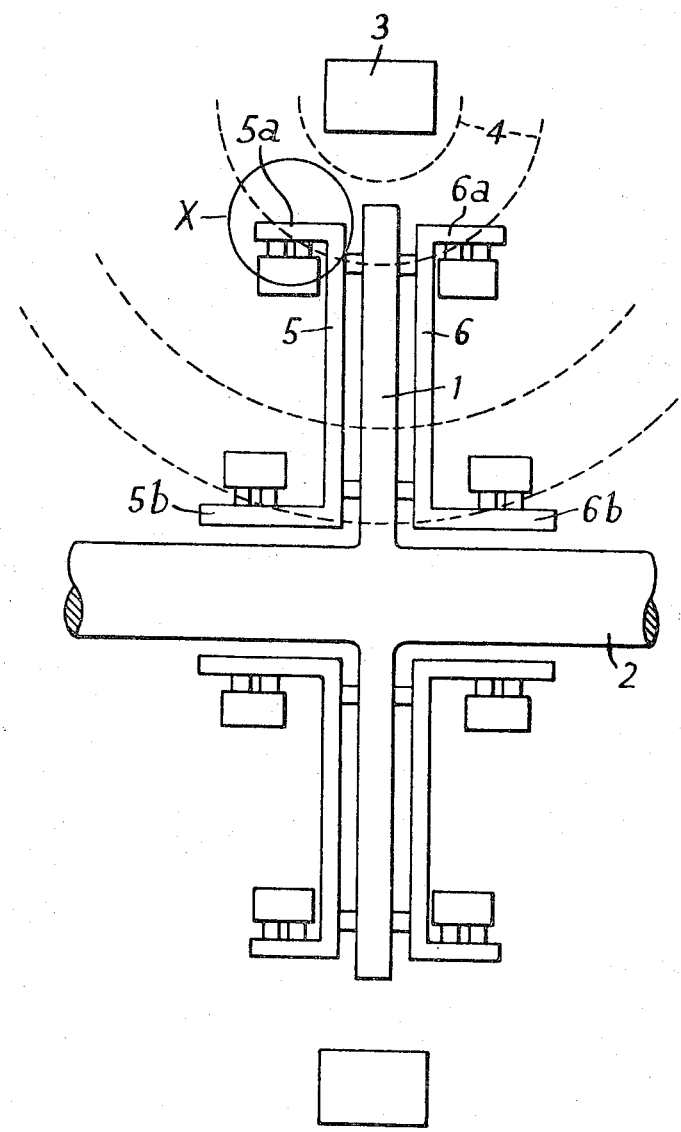
Figure 2:
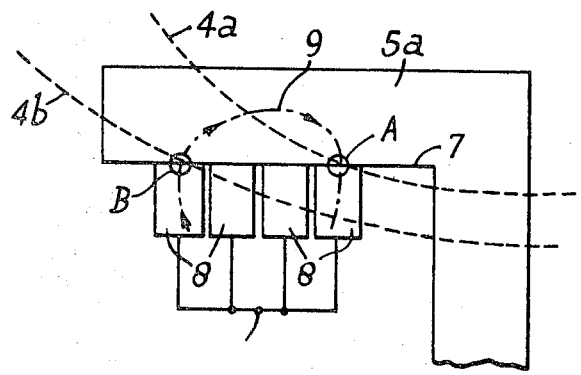
Figure 3:
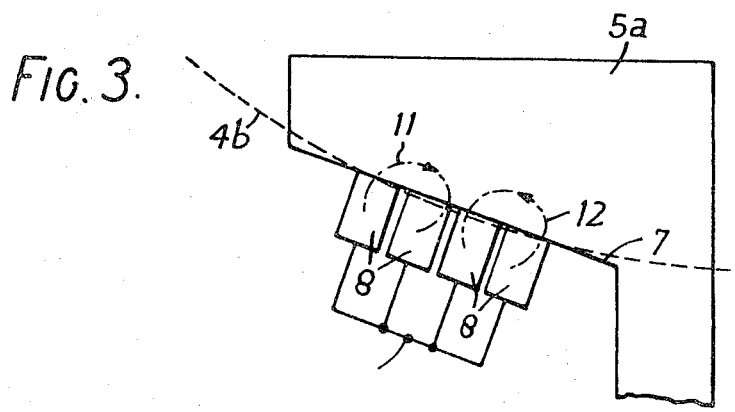
Figure 4:
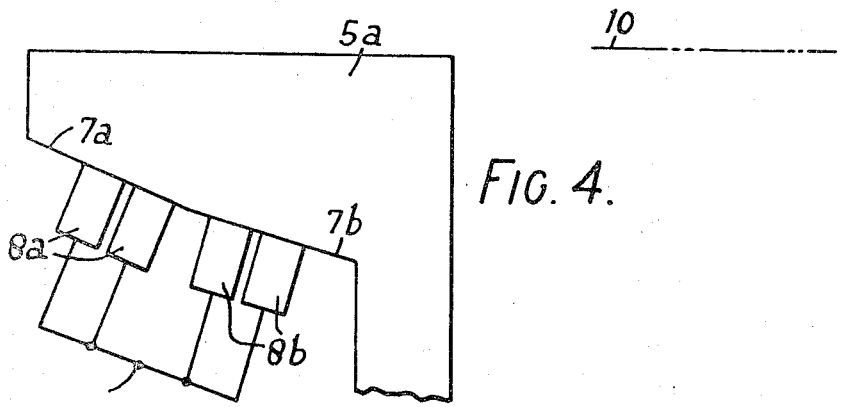

The invention will now be described in more detail with reference to the accompanying drawings, in which:

FIG. 1 shows in simplified form a longitudinal section through a disc type of homopolar dynamo-electric machine of the type described in British patent specification No. 1,133,724, FIG. 2 shows on an enlarged scale a portion X of FIG. 1 in the region of current transfer between a contact ring and brushes, FIG. 3 shows a view similar to FIG. 2 of a contact ring having a profile in accordance with one form of the present invention, and FIG. 4 shows a view similar to FIG. 3 of a contact ring in accordance with the preferred form of the invention.

The section shown in FIG. 1 is taken on a plane containing the axis of a disc-type of homopolar machine in which a rotor disc 1 rotates with a shaft 2 in a magnetic field produced by an annular field winding or stator coil 3 coaxial with the rotor.

The stator coil may be wound of superconducting material or of a conventional conductor but in either case serves to provide a stationary magnetic field the lines of force of which, indicated by the dashed lines 4, cut current-conducting paths in the rotor when the latter rotates. The rotor disc may itself constitute the rotor conductor or be a segmented disc or, as shown in FIG. 1, it may be an insulated support disc 1 on which are mounted back to back two disc-shaped assemblies 5 and 6 of conducting material.

The assemblies 5 and 6 have outer end portions 5a and 6a, respectively, and inner end portions 5b and 6b, respectively, which form contact rings for the transfer of the current flowing in the assemblies. The end portions 5a, 5b and 6a, 6b may be integral with the main radial portions or may be attached, for example by bolting. The assemblies 5 and 6 may each comprise a single conductor in the form of a continuous disc or may, as described in Swiss specification No. 470,795, comprise a plurality of radially disposed conductors in which case the contact rings consist of mutually-insulated segments.

Referring to FIG. 2, this shows on an enlarged scale the region indicated by the circle X in FIG. 1.

It will be seen that the profile 7 of the contact ring surface which contacts the brushes 8, of which there are four spaced across the contact ring and connected in parallel, consists of a straight line disposed parallel to the rotor axis. The curved lines of force 4a, 4b, shown consequently cut the brush contacting surface of the contact-ring at two portions, indicated by circles A and B, spaced from each other across the width of the contact-ring surface. Rotation of the contact ring during operation of the machine thus causes E.M.F.'s of differing values to be set up at positions such as A and B, and since the interconnected brushes 8 and the portion 5a of the contact ring together provide closed paths around which the differences between such E.M.F.'s may act, circulating currents are set up as indicated by chain-dotted line 9. Such currents constitute undesirable losses in the machine.

In order to prevent circulating currents such as indicated by line 9 being set up in the contact ring and brush gear it is necessary to provide a profile 7 following exactly the path of a line of force, say line 4b in FIG. 2. The required profile for given machine can be arrived at by means of computer techniques and a contact ring having the profile could be manufactured without undue difficulty but shaping the contact surfaces of the brushes 8 to be complementary to the contact surface of the ring could in some cases, especially with solid brushes, prove excessively complex and expensive. Preferably therefore, the profile 7 is shaped to minimize the magnitudes of circulating currents while using planar surfaces which do not require complex shapes for the brush surfaces.

This is achieved in the embodiment of the invention shown in FIG. 3 by providing a single straight line profile 7, similar to that of FIG. 2, but disposed at an angle to the axis of the machine. The disposition of the axis of the machine is indicated by centreline 10 in FIG. 3, but the distance between line 10 and portion 5a of the contact ring is not drawn to scale.

The angle which line 7 makes with the machine axis is chosen to be substantially parallel to a chord of a line of force extending across the width of contact-ring surface across which brush contact takes place. Whilst circulating currents acting in opposed senses, as indicated by lines 11 and 12, are still produced by a contact ring profile disposed as shown in FIG. 3, the magnitude of E.M.F.'s set up at the contact surface may be considerably reduced as compared with those set up with the profile disposed as shown in FIG. 2.

The magnitude of the E.M.F.'s described may be reduced still further by employing a contact ring profile in accordance with the preferred form of the invention shown in FIG. 4. In this form the profile comprises two straight line portions 7a and 7b, each disposed at a different angle to the machine axis 10, forming two axially-adjacent frusto-conical surfaces.

The point at which lines 7a and 7b intersect is generally chosen to be approximately half-way across the brush contact width of the contact ring, and the angles which the lines make with line 10 may be such that the mean of the two angles is substantially equal to the slope of a chord of a line of force extending across the brush contact width of the contact ring with respect to the machine axis.

Brushes 8a and 8b respectively contacting profiles 7a and 7b of the contact ring must be disposed in their brush-boxes at an angle to each other in order that they may operate perpendicular to the respective slip-ring surfaces, but parallel interconnection of all brushes 8a and 8b may be effected as before, as indicated.

Whilst a profile comprising two straight line portions only is shown in FIG. 4, the invention encompasses any number of straight line portions approximating to the curve of a line of force. In practice, however, the complexity of the brushgear required for profiles having more than two straight line portions may outweigh the advantages gained in reduction of circulating currents.

The shapes of contact ring surfaces produced by profiles according to the invention are frusto-conical and therefore their machining and the production of complementary brush surface shapes is not unduly difficult.

In cases where the contact ring surface is close to the plane of the stator coil, one portion of a multiple straight line profile may be parallel to the machine axis, so giving a cylindrical portion of contact surface with the adjacent portion being conical. In the opposite extreme, one portion of the profile may be a line perpendicular to the machine axis, so giving an annular disc portion of contact surface with the adjacent portion again being conical.

While in the embodiments of the invention shown in FIGS. 3 and 4 profiles of the radially outer contact ring portion 5a have been considered, similar considerations apply in the case of portion 6a and also of radially inner portions 5b, 6b.

The invention may be applied to both drum and disc types of homopolar machines, which may operate as motors or generators, and may also be applied to heteropolar machines where high magnetic fields may give rise to undesirable losses as a result of the existence of circulating currents arising due to the causes described herein.

What is claimed is:

1. A dynamo-electric machine having a rotor and a stator and including current transfer means comprising fixed and moving elements in contact with each other over a common interface, the said interface being so disposed within a magnetic field existing in the machine as to minimize the number of lines of force intersecting the interface.

2. A machine as claimed in claim 1 in the form of a homopolar machine.

3. A machine as claimed in claim 2 having a superconducting field winding.

4. A machine as claimed in claim 2 having an annular field winding and a disc-like rotor coaxial with the field winding.

5. A machine as claimed in claim 1 in which the moving element of the current transfer means is a contact ring on the rotor coaxial with the rotor.

6. A machine as claimed in claim 5 in which the contact surface of the ring has a profile as seen in a section containing the axis of the rotor which is curved to follow a line of force of the magnetic field.

7. A machine as claimed in claim 5 in which the contact surface of the ring includes at least one part which is frusto-conical.

8. A machine as claimed in claim 7 in which the contact surface of the ring is composed of two axially-adjacent frusto-conical parts of different apex angles.

9. A machine as claimed in claim 5 in which the contact ring is composed of a number of mutually-insulated segments arranged to form the ring.

10. A machine as claimed in claim 5 in which the fixed element of the current transfer means comprises one or more solid brushes in engagement with the contact surface of the ring.

11. A machine as claimed in claim 10 including at least one set of brushes spaced across the contact surface of the ring as seen in a plane containing the rotor axis and connected together in parallel.

12. A machine as claimed in claim 5 in which the contact ring is on the outer periphery of the rotor and its contact surface is on the inner face of the ring.

13. A machine as claimed in claim 1 constructed as a homopolar machine, in which the fixed element of the current transfer means comprises several sets of solid brushes mounted on the stator, and the moving element of the current transfer means is a segmented contact ring mounted on the rotor coaxial with the rotor and having a contact surface with at least one frusto-conical part, the brushes of each set being spaced across the contact surface and being connected in parallel.

References Cited

UNITED STATES PATENTS

| 1,299,053 | 4/1919 | Sterzing | 310—178 |
|---|---|---|---|
| 2,103,931 | 12/1937 | Berger | 310—178 |
| 3,443,134 | 5/1969 | Dowsett | 310—178 |
| 3,453,513 | 7/1969 | Bates | 310—220 |

FOREIGN PATENTS 701,855   12/1940   Germany.

WARREN E. RAY, Primary Examiner

R. SKUDY, Assistant Examiner

U.S. Cl. X.R.

310—220